Oct. 23, 1923.

J. G. KNIGHT 1,471,340

OUTLET OR JUNCTION BOX

Filed Sept. 15, 1921

INVENTOR
Julian Gordon Knight
BY
ATTORNEY

Oct. 23, 1923.

J. G. KNIGHT 1,471,340

OUTLET OR JUNCTION BOX

Filed Sept. 15, 1921

INVENTOR
Julian Gordon Knight
BY
ATTORNEY

Patented Oct. 23, 1923.

1,471,340

UNITED STATES PATENT OFFICE.

JULIAN GORDON KNIGHT, OF BROOKLYN, NEW YORK.

OUTLET OR JUNCTION BOX.

Application filed September 15, 1921. Serial No. 500,916.

*To all whom it may concern:*

Be it known that I, JULIAN GORDON KNIGHT, a subject of the King of Great Britain, and a resident of Brooklyn, Kings County, and State of New York, have invented certain new and useful Improvements in Outlet or Junction Boxes, of which the following is a specification.

My present invention relates to electrical distribution systems.

Particular objects of the invention are to provide an outlet box which can be used in various angular relations and with either of the two sizes of conduit usually employed.

Further special objects are to provide a box of this character which can be manufactured quite inexpensively and which, while relatively light in weight, will be strong and durable.

In the accompanying drawings forming part of this specification, I have illustrated a practical embodiment of the invention and some of its many uses, but wish it understood that the structure may be modified and its uses extended without departure from the true spirit and scope of the invention.

Figure 1 in these drawings is a perspective view of the complete box.

Figure 1:
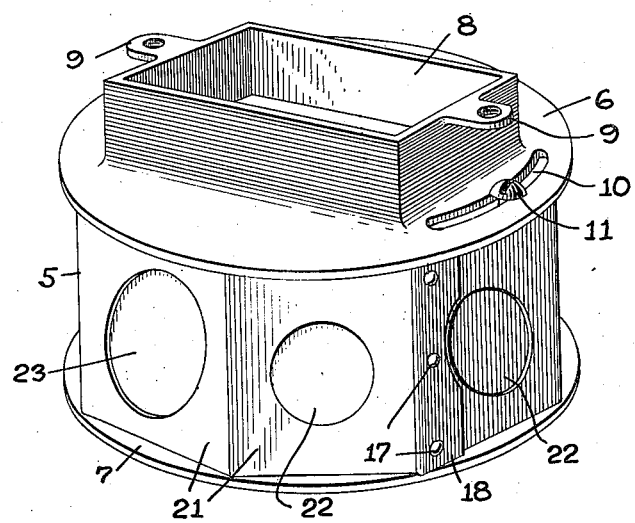

The box illustrated is shown as made up of three parts, a peripheral side wall member 5, a top or front wall 6 and a back or bottom wall 7.

The front and back wall members may be circular in outline and I have shown the front wall member as having an integral rectangular flange 8 struck up therefrom to form a housing for a switch receptacle, said flange being provided with outstanding ears 9 for the securing of the switch receptacle. Rotary adjustment of this cover is provided for by constructing it with arcuate slots 10 through which screws 11 extend into engagement with lugs 12 on the box wall.

Figure 3:
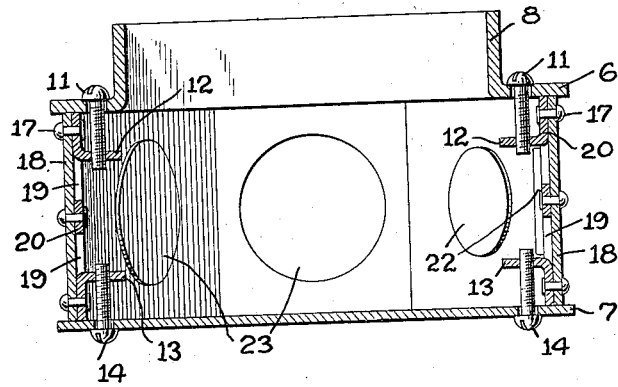
Figure 3 is a cross sectional view of the complete box, as taken on substantially the plane of line 3—3 of Figure 2.

Lugs 12 and the lugs 13 for the screws 14 which fasten the back cover in place are formed, in my invention, by partially severing the material for these lugs from the opposite edge portions of the box wall and then bending these partly severed portions inward substantially at a right angle, as shown in Figure 3.

Instead of making the box wall in one continuous piece as has heretofore been done, I preferably construct it in two duplicate parts, such as indicated at 15, having their ends connected in overlapped relation at 16, these overlapped ends being suitably secured together as by means of rivets 17, welding or the like.

A special feature of these joints is that the overlapping or outside part 18 of the joint forms a cover over the holes 19 left in the underlapping or inside part 20 of the joint by the cutting and bending out of the screw lugs 12, 13.

This construction therefore while comparatively light and inexpensive, is strong and tight, with no breaks or openings to admit concrete, moisture, dust or other foreign matter.

In order that the box may be used in the many different angular relations encountered in laying out wiring systems, I have shown the peripheral wall member as octagonal in shape, having eight angularly related substantially flat sides 21, each provided with a knockout so that any one or all of these many angularly related sides may be used for connection of a line or lines of conduit.

Figure 2:
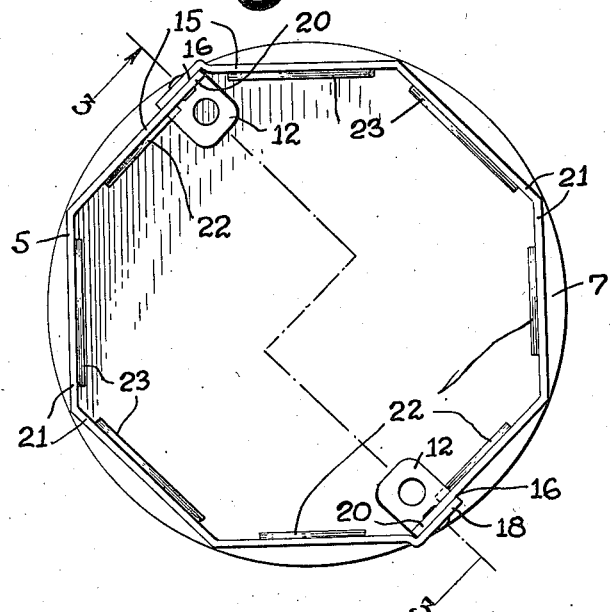
Figure 2 is a plan view of the same with the cover removed.

To gain the greatest latitude of use, these knockouts are of different sizes to accommodate the different sizes of conduit ordinarily used. At the present time, three-quarter inch conduit is used as the standard for four-wire, two-circuit work and one-half inch conduit as the standard for single-circuit, two-wire operations. I have therefore illustrated the box as having one set of three-quarter inch size knockouts and an equal number of one-half inch size knockouts. Also these knockouts are shown arranged in a special order, that is, with three of the one size, the smaller in this instance, together in one group, with the remaining one of this set directly opposite the group, as indicated by reference characters 22, Figure 2, and the knockouts of the other size (the larger, here) grouped in pairs at opposite sides of the single knockout as indicated at 23.

It will be seen that this construction makes it possible to run "straight through" connections of either the large or the small size conduit; to start with one size conduit and continue straight on with another size conduit; to enter with one size conduit and continue at either a right angle or a forty-five-degree angle with the same size or a different size conduit and to make as many different combinations of this sort as may be required in the usual wiring operation. This means that this single style and size of box will serve all purposes where it has been necessary heretofore to employ two different sizes of boxes (with either three-quarter inch or half-inch size knockouts) and to lay out the conduit in angular relations which are impossible of attainment with the boxes heretofore proposed.

Figure 4:
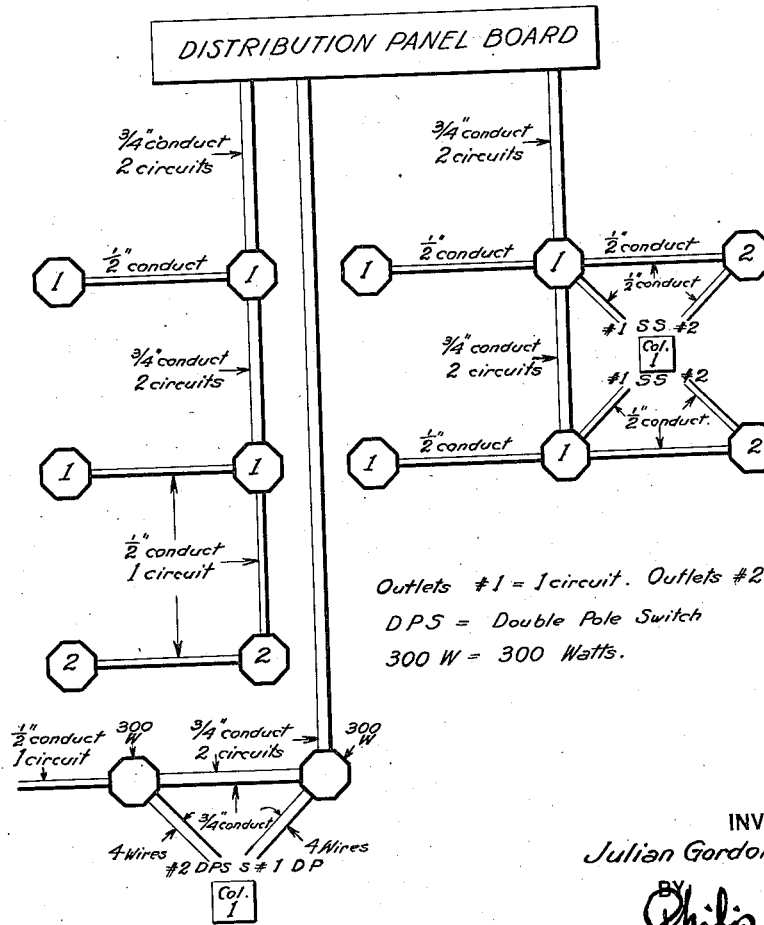
Figure 4 is a diagrammatic view illustrating some of the possibilities of the box in a distribution system.

To make these points clearer, I have shown in Figure 4 the diagram of a lay-out illustrating some of the possible uses and combinations to which the box may be put, this diagram being appropriately labeled in a manner understandable to those skilled in the art.

What I claim is:

1. An octagonal sided outlet or junction box having eight flat sides with knockouts in all such eight angularly related sides, said knockouts being of two different sizes and arranged with those of one size in a group of three with one opposite and those of the other size grouped in pairs at opposite sides of the single knockout of the first size.

2. An outlet or junction box having eight angularly related sides each having a knockout, said knockouts being of two different sizes and arranged with those of one size in a group of three with one opposite and those of the other size grouped in pairs at opposite sides of the single knockout of the first size.

3. An outlet or junction box having eight angularly related sides provided with knockouts of different sizes and arranged with those of the smaller size in a group of three with one opposite and those of the larger size grouped in pairs at opposite sides of the smaller size knockouts.

4. As an article of manufacture, a peripheral wall for outlet boxes having ends secured together by an overlapping joint and having material removed from the inner member at such overlapping joint to form a lug, with the material of the outer member at such joint covering the opening thus left by the removal of the material aforesaid.

5. A structure of the character of claim 3 made up of substantially complementary parts having their ends attached in overlapping relation and having a lug or lugs cut from the inner member of these overlapping joints and the openings left thereby covered by the outer members of such overlapping joints.

6. As an article of manufacture, a peripheral wall for outlet boxes comprising substantially complementary parts having their ends secured together by overlapping joints and having material removed from the inner member at such joints to form a lug or lugs with the material of the outer member at said joint or joints covering the opening or openings left by the removal of the material aforesaid.

In witness whereof, I have hereunto set my hand this 13th day of September, 1921.

JULIAN GORDON KNIGHT.